Oct. 10, 1933.  H. BLOMBERG  1,930,337
ELECTRIC FURNACE
Filed April 18, 1933

Inventor:
Hermann Blomberg,
by Charles E. Tullar
His Attorney.

Patented Oct. 10, 1933

1,930,337

UNITED STATES PATENT OFFICE 1,930,337

ELECTRIC FURNACE

Hermann Blomberg, Berlin-Reinickendorf, Germany, assignor to General Electric Company, a corporation of New York Application April 18, 1933, Serial No. 666,701, and in Germany May 31, 1932

3 Claims. (Cl. 13—1)

This invention relates to electric furnaces, more particularly to electrode heated salt bath furnaces wherein one electrode is formed by the crucible and the other electrode dips into the bath, and has for its object an improved furnace of this type providing increased space for the insertion of the charge into the bath for a given volume of bath.

In known types of furnaces the electrode which dips into the bath is located in the center of the bath but this has the disadvantage of unduly reducing the useful space available for charging purposes so that only comparatively small pieces can be treated in the melting bath.

These disadvantages are obviated by the present invention by providing a separate chamber for the electrodes which chamber is in communication with the main reservoir containing the bath of molten material in such manner as to induce a circulation of the bath between the two chambers.

Figure 1:
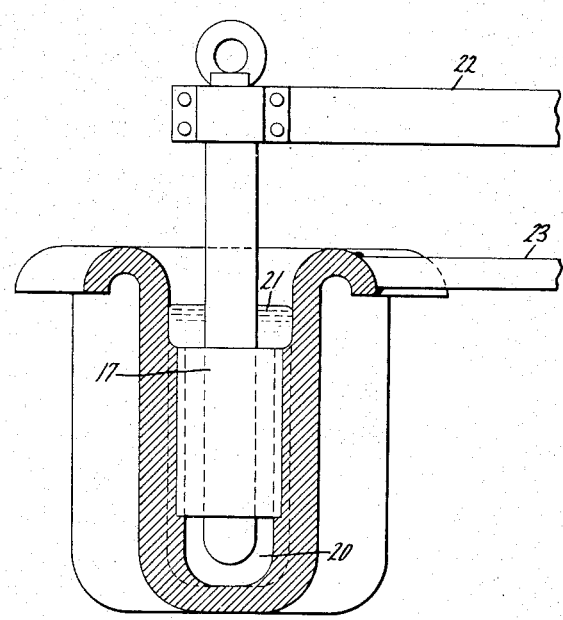
Figure 2:
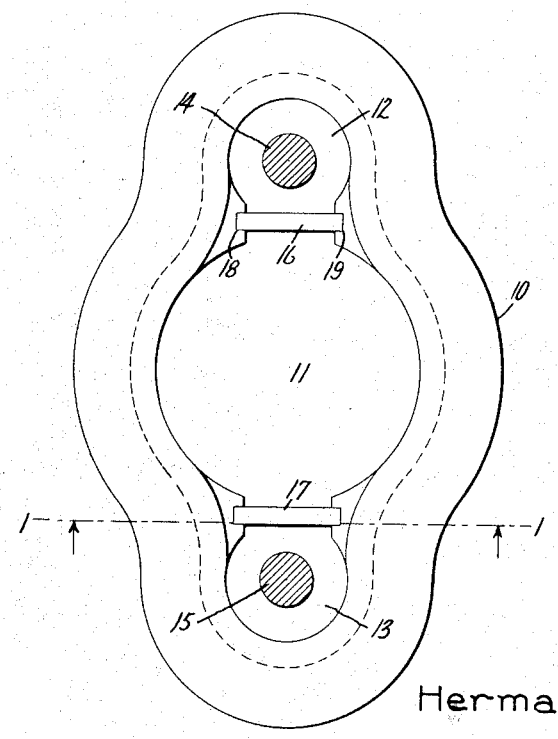

For a more complete understanding of my invention reference should be had to the accompanying drawing in which Fig. 1 is a sectional view taken along the line 1—1 of Fig. 2 showing a salt bath furnace embodying my invention, while Fig. 2 is a plan view partially in section of the furnace shown in Fig. 1.

Referring to the drawing, I have shown my invention in one form as applied to an electrode salt bath furnace provided with a plurality of symmetrically arranged electrodes, such as used in the hardening and heat treatment of metals. As shown, the furnace comprises a metal crucible 10 providing a relatively large reservoir 11 for the bath and two heating or electrode chambers 12 and 13 in which vertically arranged electrodes 14 and 15 extend, respectively, downward to a point near the bottom as indicated in Fig. 1. As shown, the reservoir 11 and the two chambers 12 and 13 are cylindrical in outline, the chambers 12 and 13 being relatively small as compared with the reservoir 11. The electrodes 14 and 15 are arranged centrally in their respective chambers.

For the purpose of providing for thermal circulation of the molten salts in the furnace, partitions 16 and 17 are provided between the respective chambers 12 and 13 and the central reservoir 11. These partitions as shown are rectangular pieces or plates which are secured in vertical guideways provided for them. For example, the partition 16 is secured in guideways 18 and 19 formed by vertical recesses or slots in opposite walls of the crucible at the point of junction between the chamber 12 and the reservoir 11.

Each partition is shorter, however, in a vertical direction than the depth of the salt in the crucible and it is placed substantially midway of the depth of the salt so as to close only the middle portion in a vertical direction of the cross sectional area of the passage between the respective chamber and the central reservoir. Thus as shown in Fig. 1 the substantially centrally located partition 17 provides a duct 20 at the bottom between its lower end and the bottom of the crucible and a space 21 at its upper end, through both of which communication is had with the central reservoir.

In the operation of the furnace the electrode and the crucible are electrically connected to a suitable source of electrical supply by means of current leads 22, one for each electrode, and a lead 23 connected to the crucible so that a current is passed through the salt in the chambers 12 and 13 between each electrode and the crucible. Upon being heated the salt in each electrode chamber produces a vigorous circulation by thermal effect in an upward direction in each chamber which draws salt from the central reservoir under the partitions which salt, after being heated by the electrodes, returns to the central reservoir by pouring over the partition. The salt is therefore vigorously circulated not only in the electrode chamber but also in the central reservoir. Thus the entire area and volume of the central reservoir is available for charging purposes.

The partition between the electrode chamber and the central reservoir may be a rigidly connected part of the crucible or may be loosely inserted in the guideways. The electrodes may be made of iron, carbon or the like. In any suitable type of compound electrode, only the lower portion below the level of the bath is made of graphite or the like.

What I claim as new and desire to secure by Letters Patent of the United States is:

1. An electric furnace comprising a crucible providing a reservoir for the charge and a chamber at one side of said reservoir, a heating electrode extending into said chamber into electrically conducting relation with the charge, means for passing an electric current through the charge between said electrode and said crucible to heat the charge in said chamber and means providing communication between said chamber and said reservoir at upper and lower regions of said reservoir for thermal circulation of the charge between said chamber and said reservoir.

2. An electric salt bath furnace comprising a crucible providing a reservoir for the charge and an electrode chamber communicating with said reservoir, an electrode extending into said chamber to a point adjacent the bottom thereof, means for passing an electric current through the charge between said electrode and said crucible to heat the charge in said chamber, and a partition between said chamber and said reservoir located substantially midway of the depth of the charge in said reservoir so as to provide ducts connecting said reservoir and chamber at upper and lower regions thereof.

3. An electric furnace comprising a crucible providing a reservoir for the charge and a plurality of electrode chambers in spaced relation with each other around said reservoir, a heating electrode extending centrally into each of said chambers to a point near the bottom thereof, means for passing an electric current through the charge between said electrodes and said crucible to heat the charge in said chambers, and means providing communication between said chambers and said reservoir at upper and lower regions thereof to provide for thermal circulation of the charge between said chambers and said reservoir.

HERMANN BLOMBERG.